US008553266B2

(12) United States Patent
Chiba et al.

(10) Patent No.: US 8,553,266 B2
(45) Date of Patent: Oct. 8, 2013

(54) DIGITAL MULTIFUNCTION PRINTER FOR MOUNTING REMOVABLE EXTERNAL STORAGE DEVICE AND IMAGE DATA STORAGE SYSTEM

(75) Inventors: Kunihisa Chiba, Osaka (JP); Takeshi Yamaguchi, Osaka (JP); Yoichi Kimura, Osaka (JP); Kazuyuki Ohgida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 346 days.

(21) Appl. No.: 13/012,289

(22) Filed: Jan. 24, 2011

(65) Prior Publication Data

US 2011/0181902 A1 Jul. 28, 2011

(30) Foreign Application Priority Data

Jan. 25, 2010 (JP) ................................ 2010-013197

(51) Int. Cl.
*G06F 3/12* (2006.01)
*G06F 15/00* (2006.01)
*G06K 15/00* (2006.01)
*G06K 1/00* (2006.01)

(52) U.S. Cl.
USPC ........ 358/1.15; 358/1.16; 358/1.13; 358/1.17

(58) Field of Classification Search
None
See application file for complete search history.

(56) References Cited

U.S. PATENT DOCUMENTS

| 7,730,225 | B2* | 6/2010 | Mizuno et al. ................ 710/8 |
| 7,944,575 | B2* | 5/2011 | Yasunaga .................... 358/1.15 |
| 2006/0146355 | A1* | 7/2006 | Kim ............................ 358/1.13 |
| 2007/0116054 | A1* | 5/2007 | Hamaguchi .................. 370/475 |
| 2008/0069122 | A1* | 3/2008 | Matsuoka et al. ........... 370/401 |
| 2008/0222411 | A1* | 9/2008 | Natsuno et al. .............. 713/153 |
| 2009/0019187 | A1* | 1/2009 | Okuma .......................... 710/9 |
| 2009/0180145 | A1 | 7/2009 | Kakizaki |
| 2009/0316178 | A1* | 12/2009 | Tanaka ........................ 358/1.14 |
| 2009/0316188 | A1* | 12/2009 | Kawabata et al. ........... 358/1.15 |

FOREIGN PATENT DOCUMENTS

| JP | 2009-171044 | 7/2009 |
| JP | 2010-167700 | 8/2010 |

* cited by examiner

*Primary Examiner* — Ming Hon
(74) *Attorney, Agent, or Firm* — Edwards Wildman Palmer LLP; David G. Conlin; Steven M. Jensen

(57) ABSTRACT

Image data in a specific data format is stored in an external storage device, whereas application software for display, editing, and printing of the image data in the specific data format is not stored in the external storage device but transmitted to an e-mail address of a user or to an IP address of a user's computer. This provides a digital multifunction printer which is capable of storing image data in a removable external storage device and which can store image data in the external storage device in such a manner that the image data is stored with a data format specific to the digital multifunction printer while the image data can be processed by other device without dropping security for the stored image data.

10 Claims, 11 Drawing Sheets

DIGITAL MULTIFUNCTION PRINTER FOR MOUNTING REMOVABLE EXTERNAL STORAGE DEVICE AND IMAGE DATA STORAGE SYSTEM

This Nonprovisional application claims priority under 35 U.S.C. §119(a) on Patent Application No. 2010-013197 filed in Japan on Jan. 25, 2010, the entire contents of which are hereby incorporated by reference.

TECHNICAL FIELD

The present invention relates to a digital multifunction printer (MFP) capable of mounting an external storage device in such a manner that the external storage device is removable from the digital multifunction printer.

BACKGROUND ART

Conventionally, there has been known a digital multifunction printer which has a scanner function for reading a document so as to generate image data of the document and a print function for printing an image corresponding to the image data on a recording material, and which is capable of storing image data scanned by a scanner in a portable external storage device such as a memory card and a USB flash drive.

For example, Patent Literature 1 discloses a technique in which when image data is written in a USB flash drive, a flag indicating whether storage of the image data is completed or not is stored in combination with the image data in the USB flash drive, and upon mounting of the USB flash drive, it is determined whether unsuccessfully written image data is stored or not in the USB flash drive according to the flag.

CITATION LIST

Patent Literature

[Patent Literature 1]
Japanese Patent Application Publication No. 2009-171044 A (published on Jul. 30, 2009)

SUMMARY OF INVENTION

Technical Problem

In general, in a digital multifunction printer having a scanner function and a print function, in order that an image scanned by a scanner is printed with high image quality, image data is processed not in a general-purpose data format such as PDF and Tiff but in a data format specific to the digital multifunction printer. If image data scanned by the scanner is converted into the general-purpose data format such as PDF and Tiff, the image data may drop its image quality. In order to avoid such drop in the image quality, image data is processed in a data format specific to the digital multifunction printer.

Accordingly, when image data to be printed by the digital multifunction printer is stored in a hard disc included in the digital multifunction printer, the image data is stored in a data format specific to the digital multifunction printer.

On the other hand, when image data scanned by a scanner is transmitted to other device or stored in a storage location accessible by other device connected with the multifunction printer via a network (a storage location such as a server etc. communicably connected with the digital multifunction printer), the image data is converted from the data format specific to the digital multifunction printer to the general-purpose data format such as PDF and Tiff so that the image data can be browsed or edited by other device, and then the image data is transmitted to the other device or stored in the storage location.

Further, since a conventional digital multifunction printer capable of mounting an external storage device is designed on the premise that a user carries image data stored in the external storage device so that the image data is displayed, edited etc. by other device, such conventional digital multifunction printer converts the image data from a data format specific to the digital multifunction printer to the general-purpose data format such as PDF and Tiff and then stores the converted image data in the external storage device.

Accordingly, when the conventional digital multifunction printer capable of mounting an external storage device once stores image data in the external storage device and then the image data is printed by the digital multifunction printer, the image data is once converted from a data format specific to the digital multifunction printer to the general-purpose data format such as PDF and Tiff and then converted into the data format specific to the digital multifunction printer again. This results in deterioration in image quality.

One possible option for solving this problem is to carry out storage of image data in an external storage device in such a manner that the image data is stored with a data format specific to the digital multifunction printer without converting the image data into the general-purpose data format such as PDF and Tiff. However, this option raises a second problem that the image data stored in the external storage device cannot be displayed or edited by other device.

One possible option for solving the second problem is to carry out storage of image data in the external storage device in such a manner that the image data is stored with the data format specific to the digital multifunction printer and at the same time an application (application software) for display, editing, or printing of the image data in the data format specific to the digital multifunction printer is stored in the external storage device. However, this option raises a security problem that if the external storage device falls into hands of a third party due to accidental loss, theft etc., the third party can easily use the image data.

The present invention was made in view of the foregoing problems. An object of the present invention is to provide a digital multifunction printer which is capable of storing image data in a removable external storage device and which can store image data in the external storage device in such a manner that the image data is stored with a data format specific to the digital multifunction printer while the image data can be processed by other device without dropping security for the stored image data.

Solution to Problem

A digital multifunction printer of the present invention includes an image reading section for reading a document so as to acquire image data of the document, an image forming section for forming on a recording material an image corresponding to image data, and a communication section for communicating with other device connected with the digital multifunction printer via a network, the digital multifunction printer further including: a memory mounting section for mounting an external storage device in such a manner that the external storage device is removable, and for storing, in the mounted external storage device, image data in a first data format used when the multifunction printer processes image data; an operation input section for receiving an operation input from a user; an authentication information storage section for storing authentication information of a registered user and transmission destination information indicative of a transmission destination to which data for the registered user is to be transmitted; an application storage section for storing application software for at least one of display, editing, and printing of the image data in the first data format; and a control section for carrying out an authentication process to determine whether a user of the external storage device is the registered user or not by comparing user authentication information stored in the external storage device mounted on the memory mounting section or user authentication information inputted by the user via the operation input section with the authentication information stored in the authentication information storage section, when the user of the external storage device is the registered user and when the image data in the first data format is stored in the external storage device, the control section transmitting, to a transmission destination indicated by the transmission destination information corresponding to the user of the external storage device, via the communication section, the application software or information for downloading the application software from the application storage section.

Advantageous Effects of Invention

With the arrangement, the digital multifunction printer includes: the memory mounting section for mounting an external storage device in such a manner that the external storage device is removable, and for storing, in the mounted external storage device, image data in the first data format used when the multifunction printer processes image data; the operation input section for receiving an operation input from a user; the authentication information storage section for storing authentication information of a registered user and transmission destination information indicative of a transmission destination to which data for the registered user is to be transmitted; and the application storage section for storing application software for at least one of display, editing, and printing of the image data in the first data format. The control section carries out the authentication process to determine whether a user of the external storage device is the registered user or not by comparing user authentication information stored in the external storage device mounted on the memory mounting section or user authentication information inputted by the user via the operation input section with the authentication information stored in the authentication information storage section, and when the user of the external storage device is the registered user and when the image data in the first data format is stored in the external storage device, the control section transmits, to a transmission destination indicated by the transmission destination information corresponding to the user of the external storage device, via the communication section, the application software or information for downloading the application software from the application storage section.

Consequently, the image data in the first data format is stored in the external storage device, whereas the application software for processing the image data in the first data format is not stored in the external storage device but transmitted to the transmission destination corresponding to the user. Accordingly, even if the external storage device falls into hands of a third party due to accidental loss or theft, there is little risk that the image data is used by the third party. Further, since the application software is automatically transmitted from the digital multifunction printer to the transmission destination corresponding to the user of the external storage device, the user can receive the application software at the user's own terminal device, and can carry out, with use of the application software, display, editing, printing etc. of the image data in the first data format stored in the external storage device.

DESCRIPTION OF EMBODIMENTS

The following explains an embodiment of the present invention.

Figure 2:
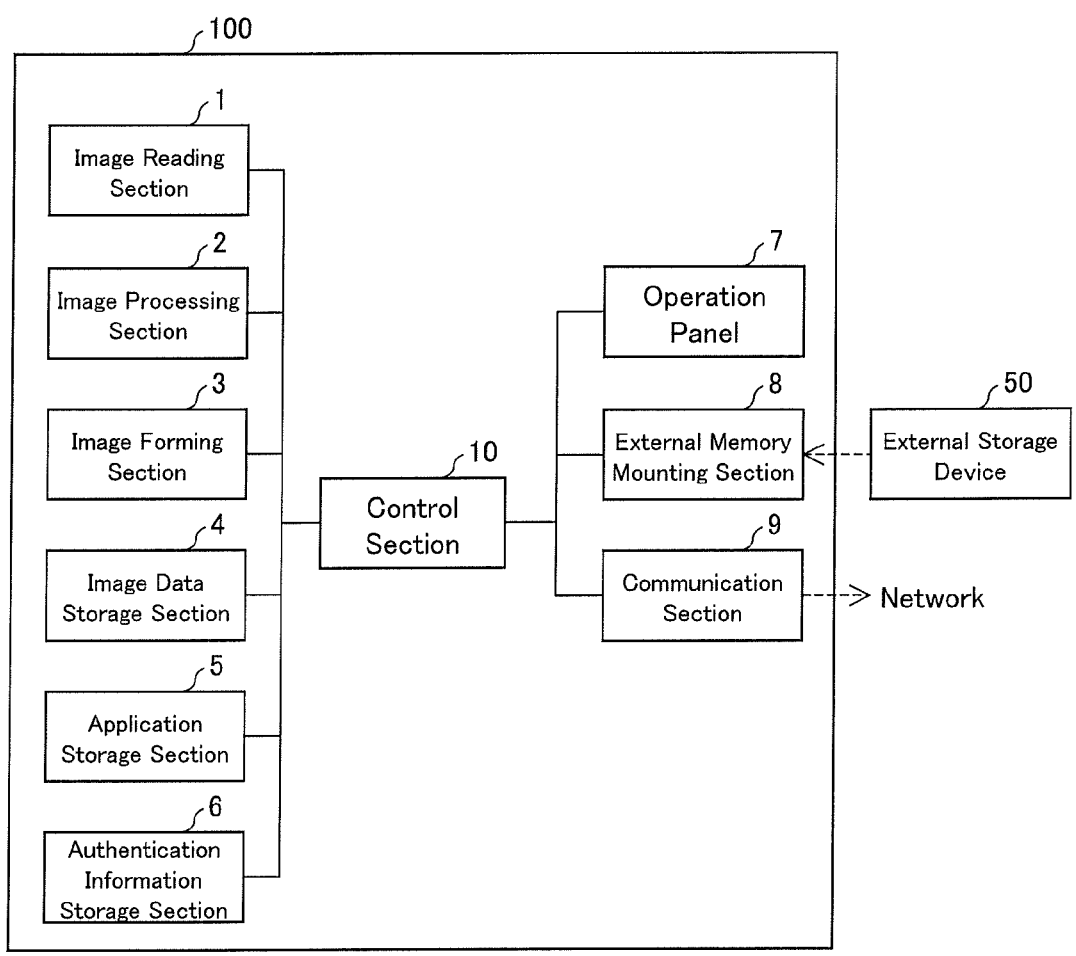
FIG. 2 is a block diagram schematically showing a configuration of a digital multifunction printer included in the image data storage system shown in FIG. 1.

FIG. 2 is a block diagram schematically showing a configuration of a digital multifunction printer 100 included in an image data storage system in accordance with the present embodiment. As shown in the drawing, the digital multifunction printer 100 includes an image reading section 1, an image processing section 2, an image forming section 3, an image data storage section 4, an application storage section 5, an authentication information storage section 6, an operation panel 7, an external memory mounting section 8, a communication section 9, and a control section 10.

The control section 10 includes a CPU (Central Processing Unit) etc. for example, and controls operations of individual sections of the digital multifunction printer 100 based on a program and various data stored in a ROM etc. (not shown) and on information etc. input via the operation panel 7.

The image reading section 1 reads an image of a document so as to generate image data, and includes a scanner section (not shown) including a device (such as a CCD (Charge Coupled Device)) for converting optical information into an electric signal. The image reading section 1 may take in an image captured by a digital camera etc. from the outside.

The image processing section 2 carries out various processes on the image data acquired by the image reading section 1. Examples of the various processes include an A/D conversion process, a shading process, a color correction process (color conversion process), an enlarging/reducing process, and a tone correction process.

The image forming section 3 forms (prints) an image corresponding to image data on a recording material. The image forming section 3 is not particularly limited and may be an electrophotographic image forming device or may be an ink-jet image forming device.

The image data storage section 4 is storage means for storing image data, and includes a hard disc drive (HDD) for example.

The application storage section 5 stores an application (application software) for carrying out various processes on image data. Examples of the various processes include a process for causing an image corresponding to image data to be displayed on display means, a process for editing image data, and a process for causing an image corresponding to image data to be formed (printed) on a recording material. The image reading section 1, the image processing section 2, and the image forming section 3 process image data in a specific data format (first data format. A data format specific to the type of the digital multifunction printer 100, to particular types including the type of the digital multifunction printer 100, or to the maker of the digital multifunction printer 100) which is a non-general-purpose data format different from a general-purpose data format such as PDF and Tiff. The application storage section 5 stores an application for carrying out various processes on image data in the specific data format.

The authentication information storage section 6 stores authentication information indicative of a registered user (e.g. user ID and password) and transmission destination information indicative of a transmission destination to which data for the registered user is to be transmitted, in such a manner that the authentication information and the transmission destination information are related to each other. In the present embodiment, an explanation is mainly made to a case where the transmission destination information is an e-mail address of a user. However, the present invention is not limited to this case. For example, the transmission destination information may be an IP address of a computer (terminal device) of a registered user.

The operation panel 7 includes a display section (not shown) for displaying information to a user and a key operation section (not shown) via which a user enters an instruction input. The operation panel 7 may be a touch panel.

The communication section 9 communicates with other device communicably connected with the digital multifunction printer 100 via a network.

The external memory mounting section 8 is capable of mounting an external storage device 50 in such a manner that the external storage device 50 is removable. The external memory mounting section 8 writes data/reads data in/from the external storage device 50. The external memory mounting section 8 includes a sensor (detecting means) for detecting whether the external storage device 50 is mounted or not, and informs the control section 10 of the result of the detection. In the present embodiment, the external memory mounting section 8 includes a USB connecter, and the external storage device 50 is a USB flash drive capable of being connected to the external memory storage section 8 via the USB connecter.

Configurations of the external memory mounting section 8 and the external storage device 50 are not limited to the above. Examples of the external storage device 50 may include discs including a magnetic disc such as a Floppy® disc and hard disc and an optical disc such as CD-ROM, MO, MD, DVD, and CD-R, cards such as an IC card (including a memory card) and an optical card, and semiconductor memories such as mask ROM, EPROM, EEPROM, and a flash ROM. The external memory mounting section 8 should be in accordance with the type of the external storage device 50.

Figure 3:
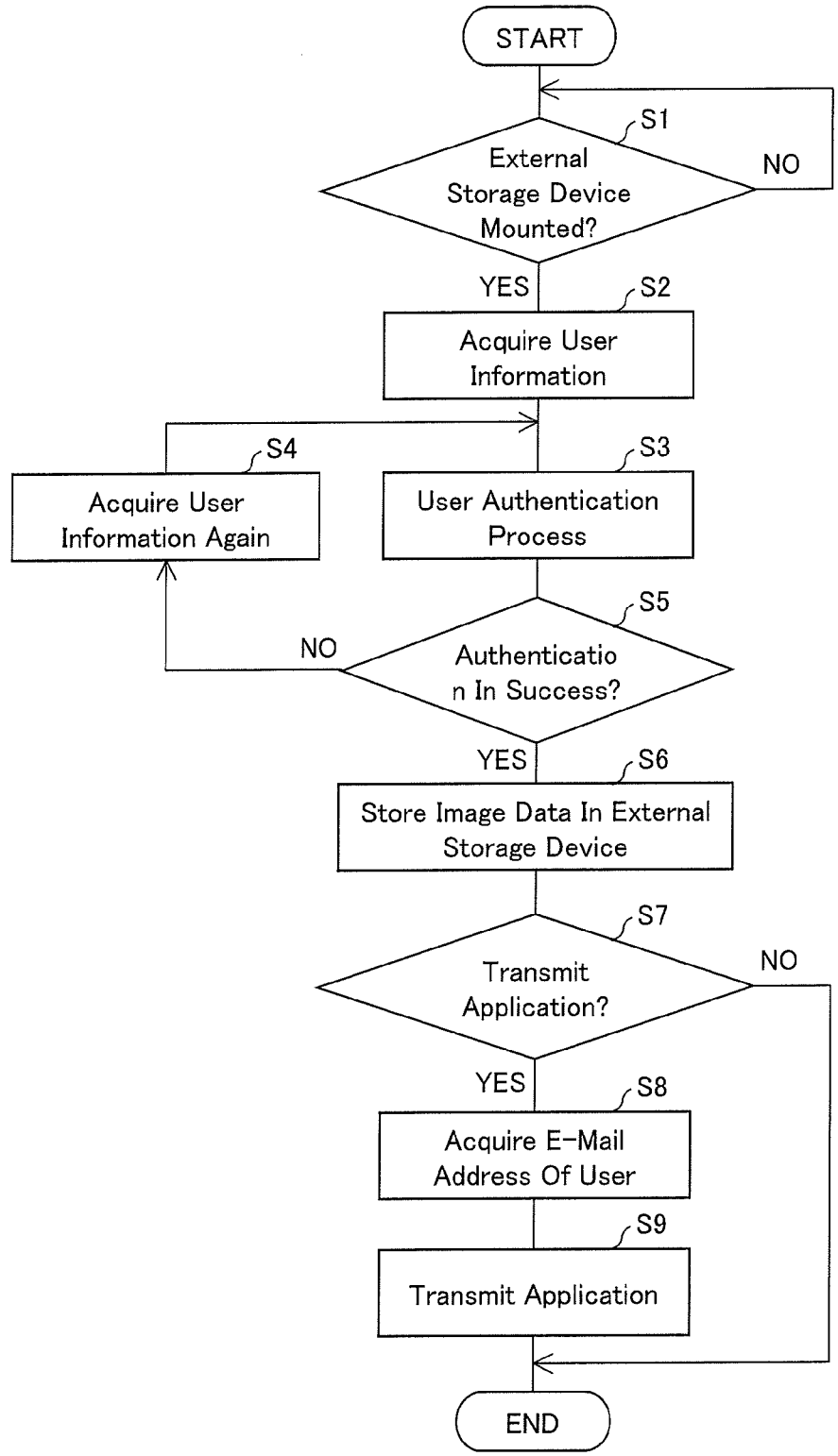
FIG. 3 is a flowchart showing a flow of a process in the digital multifunction printer shown in FIG. 2.

With reference to a flowchart of FIG. 3, the following explains a flow of a process of storing image data in the external storage device 50.

The control section 10 monitors whether the external storage device 50 is mounted to the external memory mounting section 8 or not (S1). If the external storage device 50 is not mounted, the control section 10 continues to monitor. On the other hand, if the external storage device 50 is mounted to the external memory mounting section 8, the control section 10 acquires user authentication information from the external storage device 50 or via the operation panel 7 (S2). That is, the control section 10 acquires user authentication information stored in the external storage device 50 or user authentication information inputted by a user via the operation panel 7. The operation panel 7 may be designed such that a display section displays a window for urging a user to input user authentication information and the user inputs the user authentication information in response to the urge.

Subsequently, the control section 10 carries out an authentication process by comparing the user authentication information acquired from the external storage device 50 or via the operation panel 7 with authentication information indicative of a registered user which information has been stored in the authentication information storage section 6 in advance (S3). That is, the control section 10 determines whether a user of the external storage device 50 is a registered user whose authentication information has been registered in advance.

When the authentication process is carried out in failure, the control section 10 causes the display section of the operation panel 7 to display a window which indicates the failure of the authentication process and which urges a user to reenter user authentication information, receives reentry of the user authentication information by the user (S4), and goes back to S3 to carry out the authentication process again.

In the present embodiment, when the authentication process is carried out in failure, i.e. when the control section 10 determines that the user of the external storage device 50 is not a registered user, storage of image data in the external storage device 50 is prohibited. However, the present invention is not limited to this. For example, the present invention may be arranged such that there is provided a data conversion section (not shown) for converting image data in a specific data format into data in a general-purpose data format such as PDF and Tiff, and when the user of the external storage device 50 is a registered user, the user may select in which data format the image data is to be stored in the external storage device 50. That is, the user may select whether storage of image data in the external storage device 50 is carried out with the data format specific to the digital multifunction printer 100 or with the general-purpose data format. Further, the present invention may be arranged such that when the user of the external storage device 50 is not a registered user, storage of image data only in the general-purpose data format in the external storage device 50 is allowed. Alternatively, the present invention may be arranged such that even when the user of the external storage device 50 is not a registered user, storage of image data in the specific data format in the external storage device 50 is allowed. However, in this case, if the user wishes to use the image data stored in the external storage device 50, it is necessary for the user to carry out a user registration process etc. in order to get an application for the image data in the specific data format.

When it is determined in S5 that the authentication process is carried out in success, the control section 10 causes image data in the specific data format to be stored in the external storage device 50 (S5). For example, the present invention may be arranged such that a list of image data stored in the image data storage section 4 is displayed on the display section of the operation panel 7 in order that a user selects image data to be stored in the external storage device 50, or such that when the image reading section 1 captures image data while the external storage device 50 is mounted to the digital multifunction printer 100, the image data is stored in the external storage device 50.

Subsequently, the control section 10 determines whether an application for display, editing, printing etc. of image data in the specific data format is to be sent to an e-mail address of the user (S7). This determination may be carried out in such a manner that the control section 10 causes the operation panel 7 to display a window for inquiring the user of whether to transmit the application or not and the control section 10 determines based on an instruction from the user. Alternatively, this determination may be carried out in such a manner that records of applications having been transmitted to individual registered users are stored in the authentication information storage section 6 and it is determined whether the user in question is a user to whom a particular application has been transmitted or not, and the control section 10 determines whether to transmit the application or not based on the result of the determination.

When the control section 10 determines that the application is not to be transmitted, the control section 10 finishes the process.

On the other hand, when the control section 10 determines that the application is to be transmitted, the control section 10 reads out, from the authentication information storage section 6, an e-mail address of the user for whom the authentication process has been carried out in success (S8). The present invention may be arranged such that the user enters, via the operation panel 7 if necessary, a destination to which the application is to be transmitted.

Thereafter, the control section 10 controls the communication section 9 so that the communication section 9 transmits the application to the e-mail address of the user, and finishes the process (S9).

Figure 1:
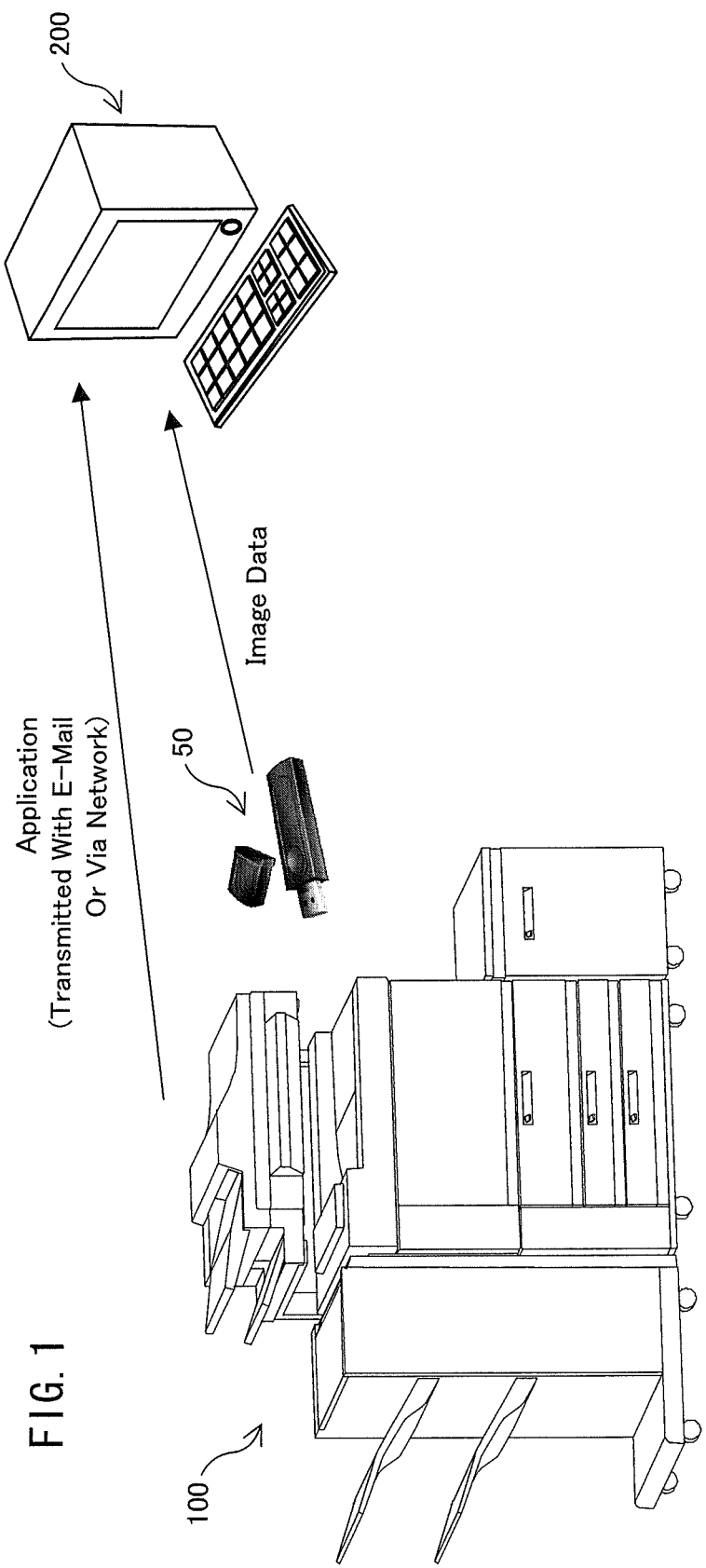
FIG. 1 is an explanatory drawing schematically showing a process of storing image data in an external storage device, and a process of transmitting an application, in an image data storage system in accordance with one embodiment of the present invention.

FIG. 1 is an explanatory drawing schematically showing a process of storing image data in the external storage device 50 in accordance with the present embodiment, and a process of transmitting an application. As shown in the drawing, image data in the specific data format is stored in the external storage device 50, and an application for display, editing, and printing of the image data in the specific data format is transmitted from the digital multifunction printer 100 to an e-mail address of the user. Thus, the user can acquire, at the user's own computer (terminal device) 200, the application transmitted from the digital multifunction printer 100, and display, edit, or print image data stored in the external storage device 50, with use of the application.

As described above, the digital multifunction printer 100 in accordance with the present embodiment causes image data in the specific data format to be stored in the external storage device 50 and transmits an application for display, editing, and printing of the image data in the specific data format to an e-mail address of a user.

Consequently, the user receives the application transmitted via e-mail and can, with use of the application, display, edit, and print the image data in the specific data format stored in the external storage device 50. Since the application is not stored in the external storage device 50, even if the external storage device 50 falls into hands of a third party due to accidental loss or theft, there is little risk that the image data stored in the external storage device 50 is used by the third party.

In the present embodiment, when image data in the specific data format is stored in the external storage device 50, the control section 10 transmits an application to an e-mail address of a user. However, the timing of transmitting an application is not limited to this. For example, the present invention may be arranged such that the control section 10 transmits an application when a user enters an application transmission instruction via the operation panel 7 or the control section 10 transmits an application when the external storage device 50 is dismounted from the external memory mounting section 8.

Figure 4:
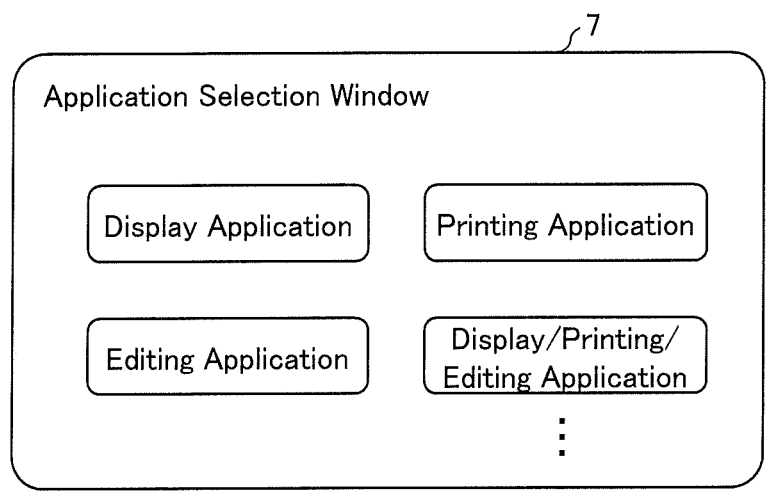
FIG. 4 is an explanatory drawing showing an example of an application selection window shown on an operation panel of the digital multifunction printer shown in FIG. 2.

In the present embodiment, an application for display, printing, and editing of image data is transmitted. Alternatively, the present invention may be arranged such that a window for a user to select an application to be transmitted is displayed on the display section of the operation panel 7 as shown in FIG. 4, and an application selected by the user is transmitted. In the example of FIG. 4, the user selects a desired application out of a display application for displaying image data in the specific data format, a printing application for printing image data in the specific data format, an editing application for editing image data in the specific data format, and a display/printing/editing application for display/printing/editing of image data in the specific data format.

In the present embodiment, an application is transmitted to an e-mail address of a user. Alternatively, the present invention may be arranged such that an IP address of a user's computer (terminal device) has been stored in the authentication information storage section 6 in advance, and an application is transmitted to the IP address.

In the present embodiment, the digital multifunction printer 100 transmits, to an e-mail address of a user or an IP address, an application stored in the application storage section 5 of the digital multifunction printer 100. However, the present invention is not limited to this case.

Figure 5:
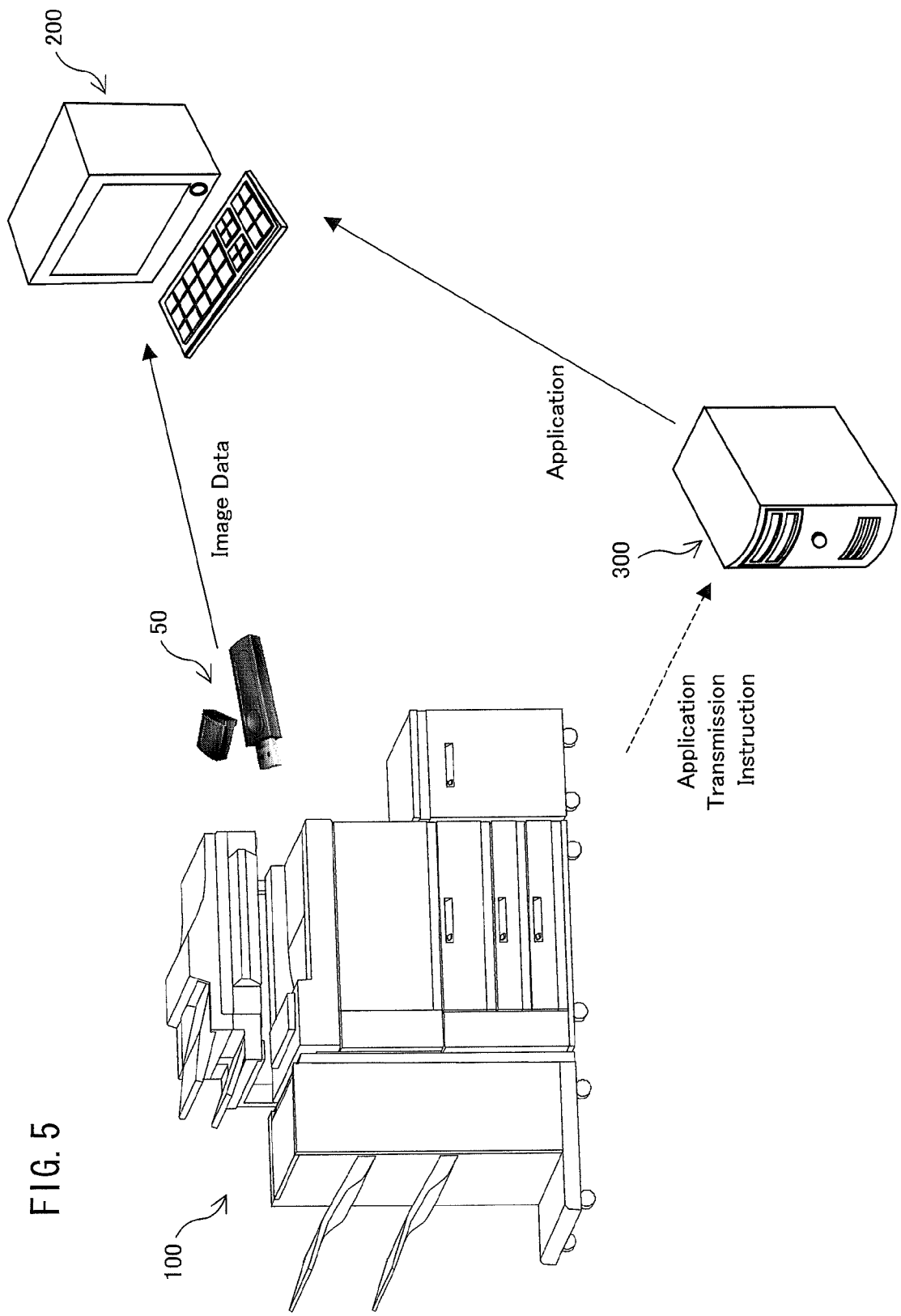
FIG. 5 is an explanatory drawing showing a modification example of a process of storing image data in the external storage device, and a process of transmitting an application, each carried out by the digital multifunction printer shown in FIG. 2.

For example, the present invention may be arranged such that as shown in FIG. 5, when the digital multifunction printer 100 transmits, to a server 300, an application transmission instruction including (i) information indicative of an application to be transmitted and (ii) information indicative of a destination (e-mail address or IP address) to which the application is to be transmitted, the server 300 transmits the application to the designated destination.

Figure 11:
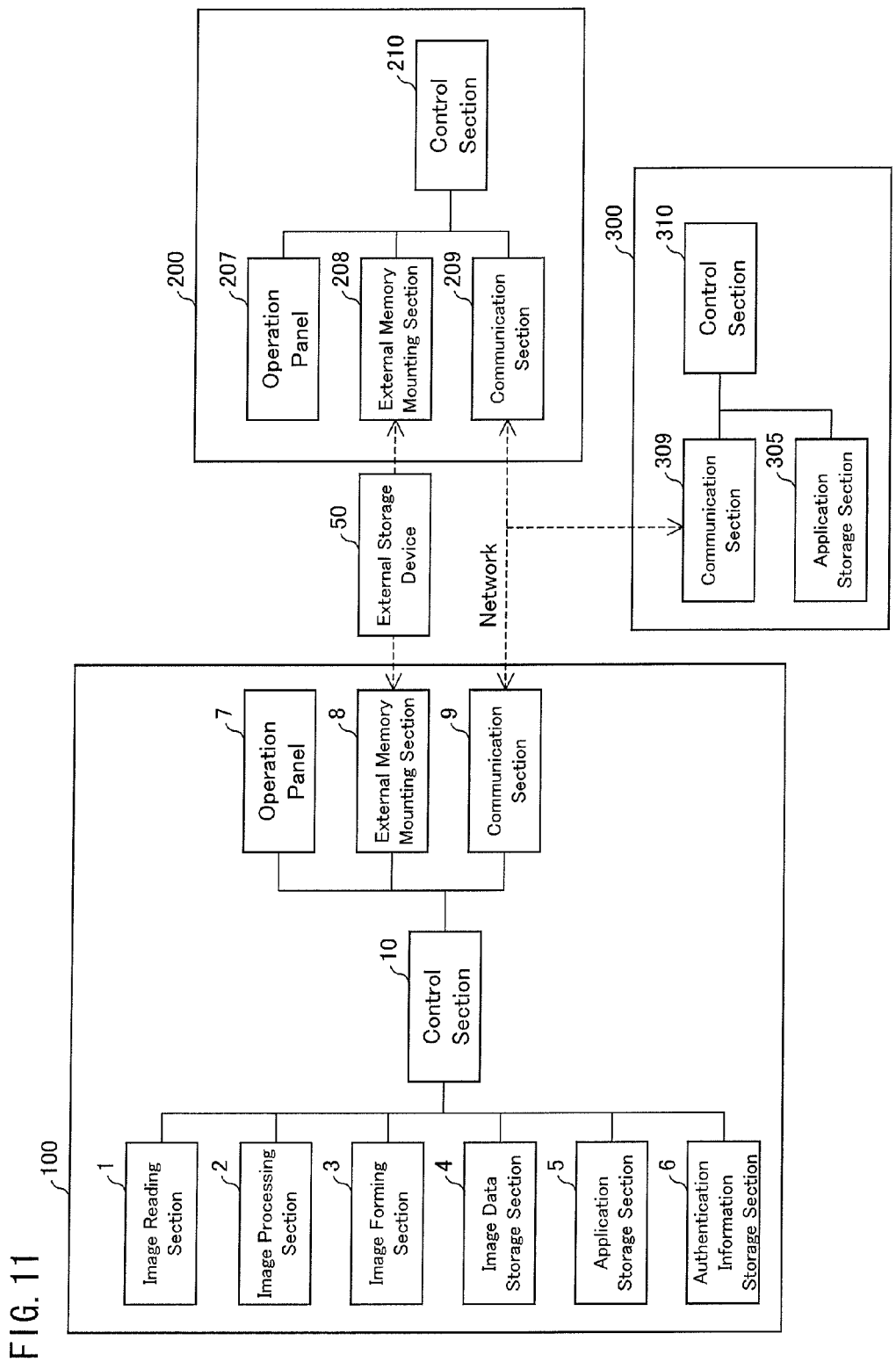
FIG. 11 is a block diagram schematically showing configurations of a digital multifunction printer, a computer, and a server each included in a modification example of the image data storage system shown in FIG. 1.

Specifically, as shown in FIG. 11, in the server 300, there are provided a communication section (third communication section) 309 for communicating with other device connected with the sever 300 via a network and an application storage section 305 for storing an application corresponding to the specific data format. The control section 10 of the digital multifunction printer 100 transmits an application transmission instruction to the server 300 via the communication section 9, and when the communication section 309 of the server 300 receives the application transmission instruction from the digital multifunction printer 100, the control section 310 of the server 300 transmits the application to the designated destination.

As above, in the modification example of the present invention, an application is stored in the server 300. Accordingly, by causing the server 300 to always store an application of the newest version, it is possible to easily distribute the application of the newest version to a user even if the application of the newest version is released after the digital multifunction printer 100 is released in the market.

Figure 6:
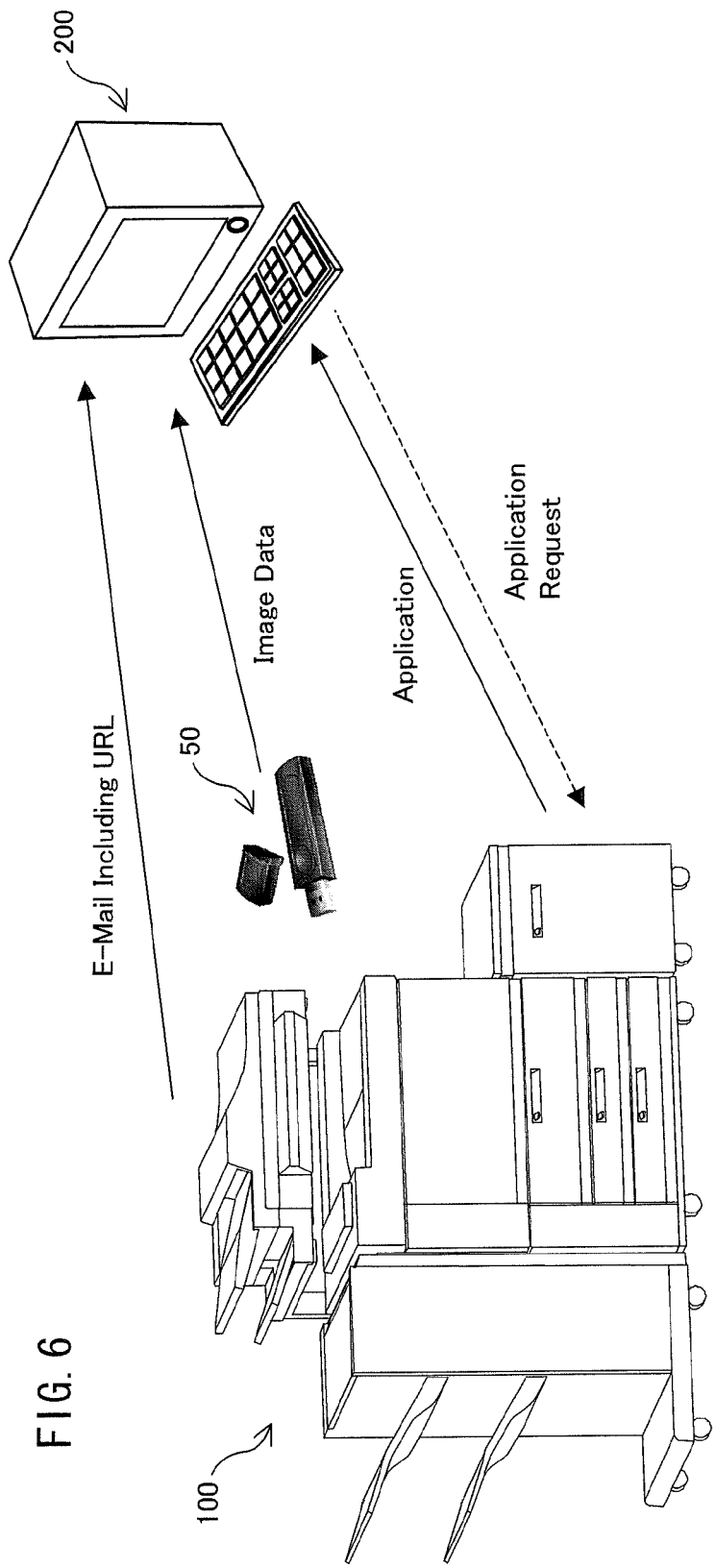
FIG. 6 is an explanatory drawing showing a modification example of a process of storing image data in the external storage device, and a process of transmitting an application, each carried out by the digital multifunction printer shown in FIG. 2.
Figure 7:
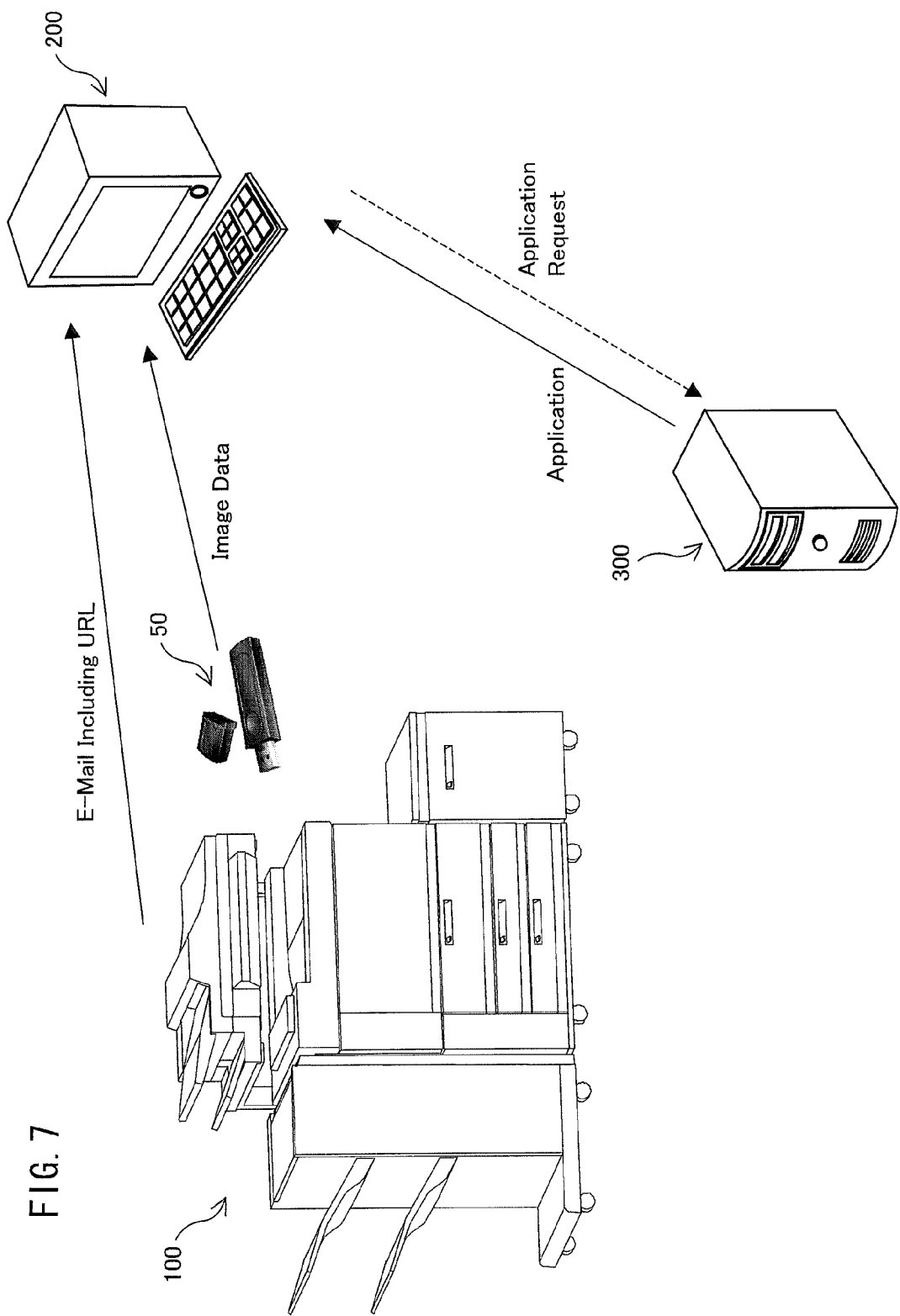
FIG. 7 is an explanatory drawing showing a modification example of a process of storing image data in the external storage device, and a process of transmitting an application, each carried out by the digital multifunction printer shown in FIG. 2.
Figure 8:
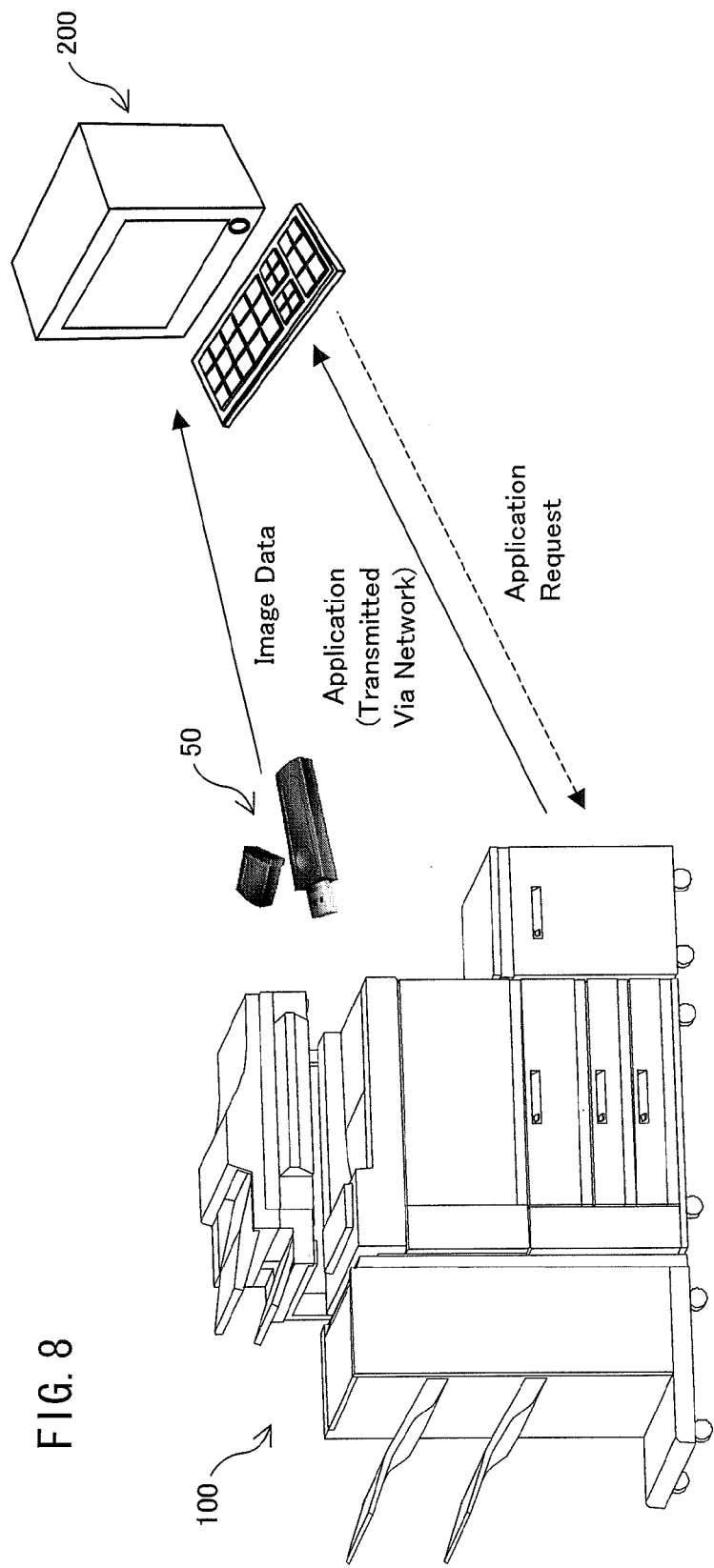
FIG. 8 is an explanatory drawing showing a modification example of a process of storing image data in the external storage device, and a process of transmitting an application, each carried out by the digital multifunction printer shown in FIG. 2.
Figure 9:
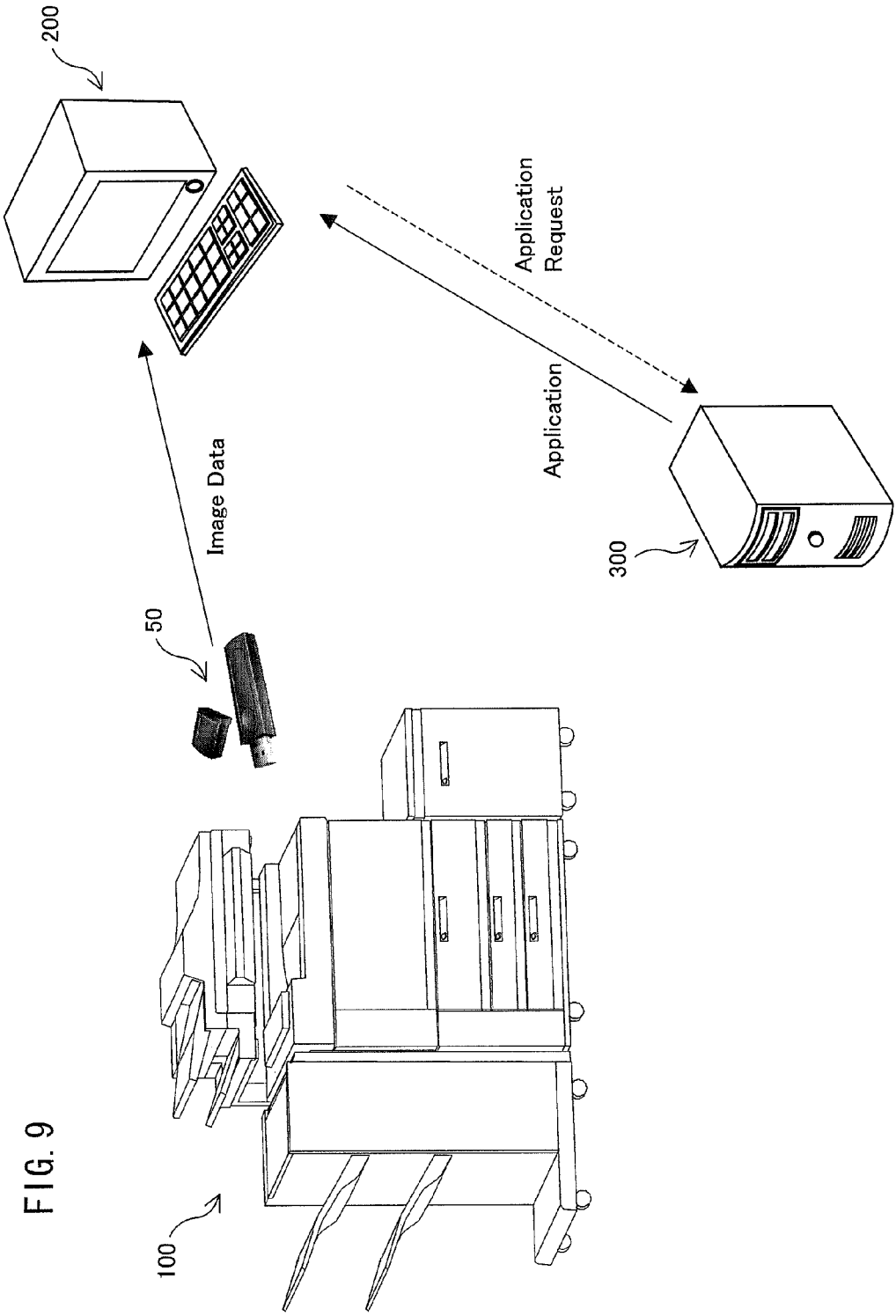
FIG. 9 is an explanatory drawing showing a modification example of a process of storing image data in the external storage device, and a process of transmitting an application, each carried out by the digital multifunction printer shown in FIG. 2.

In the present embodiment, an application itself is transmitted to an e-mail address of a user or an IP address. However, the present invention is not limited to this case. For example, the present invention may be arranged such that as shown in FIGS. 6 and 7, the digital multifunction printer 100 transmits, to an e-mail address of a user or an IP address of a user's computer, an e-mail including information for downloading (acquiring) an application (e.g. location where the application is stored or URL etc. of a device for transmitting the application). Alternatively, the digital multifunction printer 100 may cause the display section of the operation panel 7 to display, to a user, information for downloading (acquiring) an application. Alternatively, the digital multifunction printer 100 may transmit, to an e-mail address of a user or an IP address of a user's computer, an e-mail including information for downloading an application or cause the display section of the operation panel 7 to display such information, only when the user authentication process is carried out in success.

Information for downloading an application is informed to a user as above, and the user causes the computer (terminal device) 200 to request a location where the application is stored or a device for transmitting the application (digital multifunction printer 100 or server 300) to transmit the application. Thus, the user can acquire the application.

Specifically, as shown in FIG. 11 for example, the computer 200 is designed to include a communication section (second communication section) 209 for communicating with other device connected with the computer 200 via a network, an external memory mounting section (second memory mounting section) 208 for mounting the external storage device 50 in a such manner that the external storage device 50 is removable, an operation input section (second operation input section) 207 for receiving an instruction input from a user, and a control section (second control section) 210 for controlling the communication section 209. When receiving an application request instruction from a user via the operation input section 207, the control section 210 transmits an application transmission request to the digital multifunction printer 100 or the server 300 via the communication section 209. Thus, it is possible to acquire, from the digital multifunction printer 100 or the server 300, an application corresponding to image data in the specific data format.

Figure 10:
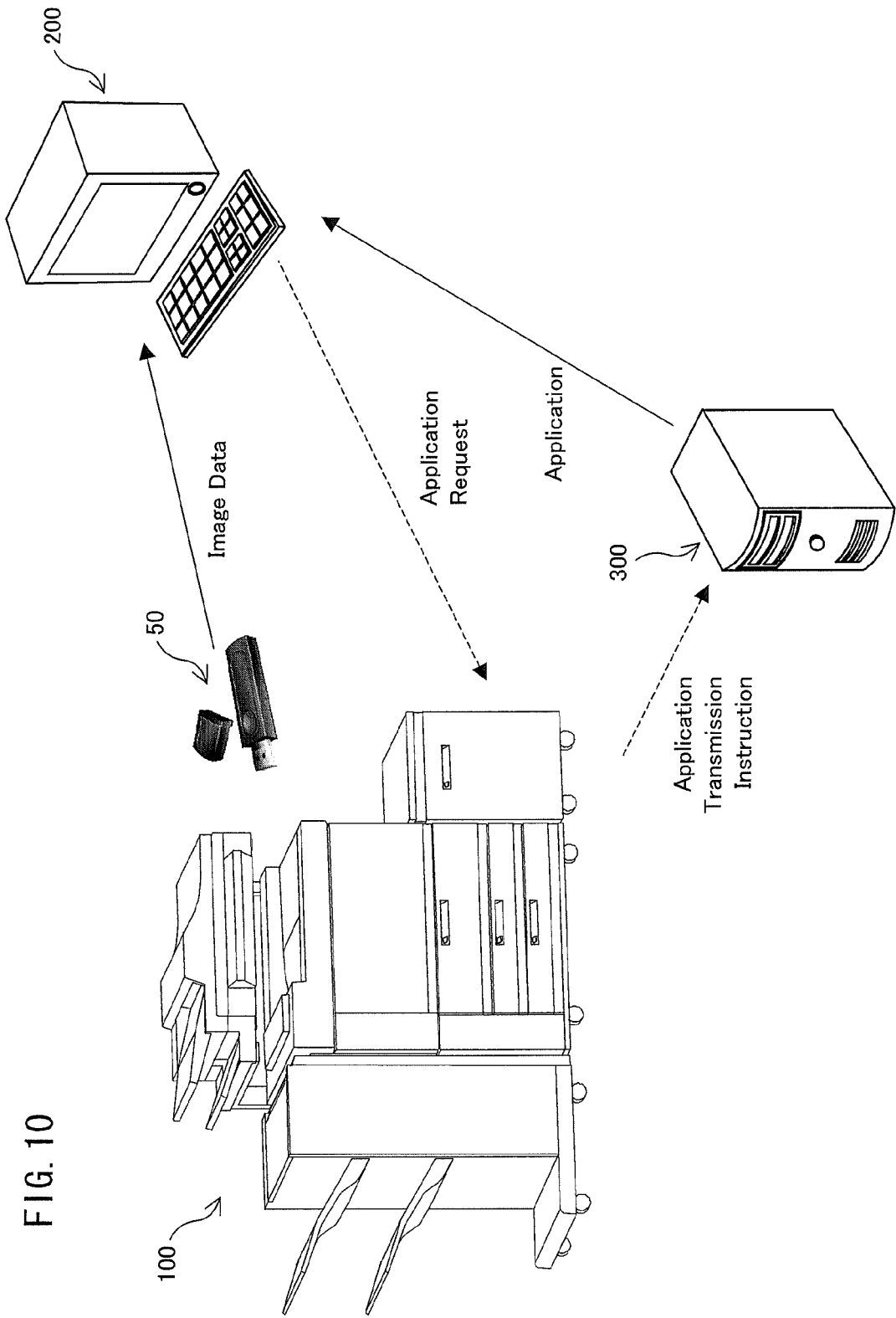
FIG. 10 is an explanatory drawing showing a modification example of a process of storing image data in the external storage device, and a process of transmitting an application, each carried out by the digital multifunction printer shown in FIG. 2.

The present invention may be arranged such that as shown in FIG. 10, a user causes the computer 200 to request the digital multifunction printer 100 to transmit an application, the digital multifunction printer 100 transmits an application transmission instruction to the server 300, and the server 300 transmits the application to an e-mail address of the user or an IP address of the computer 200 in response to the transmission instruction. Specifically, when the user inputs an application transmission request via the operation input section 207 of the computer 200, the control section 210 transmits the application transmission request to the digital multifunction printer 100 via the communication section 209. When the communication section 9 of the digital multifunction printer 100 receives the application transmission request from the computer 200, the control section 10 of the digital multifunction printer 100 transmits an application transmission instruction to the server 300 via the communication section 9. The transmission instruction includes an IP address of the computer 200 or an e-mail address of the user. When the communication section 309 of the server 300 receives the application transmission request from the digital multifunction printer 100, the control section 310 of the server 300 extracts, from the application storage section 305, the application designated by the transmission instruction, and transmits via the communication section 309 the application to the destination (computer 200 or e-mail address of the user) designated by the transmission instruction.

In each of the above embodiments, each section (block) of the digital multifunction printer 100 may be realized by software by using a processor such as a CPU. In this case, the digital multifunction printer 100 includes: CPUs (central processing unit) for executing a control program for realizing functions of each block; ROMs (read only memory) that store the program; RAMs (random access memory) that develop the program; storage devices (storage mediums) for storing the program and various data; and the like. The object of the present invention can be realized in such a manner that the digital multifunction printer 100 is provided with a computer-readable storage medium for storing program codes (such as executable program, intermediate code program, and source program) of the control program of the digital multifunction printer 11 which control program serves as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy Disc® and a hard disc), and optical discs (e.g. CD-ROM, MO, MD, DVD, and CD-R), Further, the storage medium may be cards such as an IC card (including a memory card) and an optical card, or semiconductor memories such as mask ROM, EPROM, EEPROM, and flash ROM.

Further, the digital multifunction printer 100 may be arranged so as to be connectable to a communication network so that the program code is supplied to the digital multifunction printer 100 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Each block of the digital multifunction printer 100 can be realized by a hardware logic as well as software, or may be a combination of hardware carrying out some of the processes and computing means for executing software for controlling the hardware and executing other processes.

As described above, the digital multifunction printer of the present invention includes an image reading section for reading a document so as to acquire image data of the document, an image forming section for forming on a recording material an image corresponding to image data, and a communication section for communicating with other device connected with the digital multifunction printer via a network, the digital multifunction printer further including: a memory mounting section for mounting an external storage device in such a manner that the external storage device is removable, and for storing, in the mounted external storage device, image data in a first data format used when the multifunction printer processes image data; an operation input section for receiving an operation input from a user; an authentication information storage section for storing authentication information of a registered user and transmission destination information indicative of a transmission destination to which data for the registered user is to be transmitted; an application storage section for storing application software for at least one of display, editing, and printing of the image data in the first data format; and a control section for carrying out an authentication process to determine whether a user of the external storage device is the registered user or not by comparing user authentication information stored in the external storage device mounted on the memory mounting section or user authentication information inputted by the user via the operation input section with the authentication information stored in the authentication information storage section, when the user of the external storage device is the registered user and when the image data in the first data format is stored in the external storage device, the control section transmitting, to a transmission destination indicated by the transmission destination information corresponding to the user of the external storage device, via the communication section, the application software or information for downloading the application software from the application storage section.

With the arrangement, the digital multifunction printer includes: the memory mounting section for mounting an external storage device in such a manner that the external storage device is removable, and for storing, in the mounted external storage device, the image data in a first data format used when the multifunction printer processes image data; the operation input section for receiving an operation input from a user; the authentication information storage section for storing authentication information of a registered user and transmission destination information indicative of a transmission destination to which data for the registered user is to be transmitted; and the application storage section for storing application software for at least one of display, editing, and printing of the image data in the first data format. The control section carries out the authentication process to determine whether a user of the external storage device is the registered user or not by comparing user authentication information stored in the external storage device mounted on the memory mounting section or user authentication information inputted by the user via the operation input section with the authentication information stored in the authentication information storage section, and when the user of the external storage device is the registered user and when the image data in the first data format is stored in the external storage device, the control section transmits, to a transmission destination indicated by the transmission destination information corresponding to the user of the external storage device, via the communication section, the application software or information for downloading the application software from the application storage section.

Consequently, the image data in the first data format is stored in the external storage device, whereas the application software for processing the image data in the first data format is not stored in the external storage device but transmitted to the transmission destination corresponding to the user. Accordingly, even if the external storage device falls into hands of a third party due to accidental loss or theft, there is little risk that the image data is used by the third party. Further, since the application software is automatically transmitted from the digital multifunction printer to the transmission destination corresponding to the user, the user of the external storage device can receive the application software at the user's own terminal device, and can carry out, with use of the application software, display, editing, printing etc. of the image data in the first data format stored in the external storage device.

The digital multifunction printer of the present invention may be arranged such that when the memory mounting section stores image data in the external storage device, when image data is stored in the external storage device and then the control section receives an application transmission instruction from the user via the operation input section, or when image data is stored in the external storage device and then the external storage device is dismounted from the memory mounting section, the control section transmits, to the transmission destination indicated by the transmission destination information corresponding to the user of the external storage device, via the communication section, the application software or the information for downloading the application software from the application storage section.

With the arrangement, when the image data in the first data format is stored in the external storage device, the application software for processing the image data in the first data format can be automatically transmitted to the transmission destination corresponding to the user of the external storage device.

The image data storage system of the present invention includes: a digital multifunction printer including an image reading section for reading a document so as to acquire image data of the document, an image forming section for forming on a recording material an image corresponding to image data, and a communication section for communicating with other device connected with the digital multifunction printer via a network; and a server including an application storage section for storing application software for at least one of display, editing, and printing of image data in a first data format used when the multifunction printer processes image data, the digital multifunction printer further including: a memory mounting section for mounting an external storage device in such a manner that the external storage device is removable, and for storing, in the mounted external storage device, the image data in the first data format; an operation input section for receiving an operation input from a user; an authentication information storage section for storing authentication information of a registered user and transmission destination information indicative of a transmission destination to which data for the registered user is to be transmitted; and a control section for carrying out an authentication process to determine whether a user of the external storage device is the registered user or not by comparing user authentication information stored in the external storage device mounted on the memory mounting section or user authentication information inputted by the user via the operation input section with the authentication information stored in the authentication information storage section, when the user of the external storage device is the registered user and when the image data in the first data format is stored in the external storage device, the control section transmitting, to the server via the communication section, a transmission instruction to transmit, from the server, the application software to a transmission destination indicated by the transmission destination information corresponding to the user of the external storage device, or the control section transmitting, to a transmission destination indicated by the transmission destination information corresponding to the user of the external storage device, via the communication section, information for downloading the application software from the application storage section.

With the arrangement, the digital multifunction printer includes: the memory mounting section for mounting an external storage device in such a manner that the external storage device is removable, and for storing, in the mounted external storage device, the image data in a first data format used when the multifunction printer processes image data; the operation input section for receiving an operation input from a user; the authentication information storage section for storing authentication information of a registered user and transmission destination information indicative of a transmission destination to which data for the registered user is to be transmitted; and the application storage section for storing application software for at least one of display, editing, and printing of the image data in the first data format. The control section carries out the authentication process to determine whether a user of the external storage device is the registered user or not by comparing user authentication information stored in the external storage device mounted on the memory mounting section or user authentication information inputted by the user via the operation input section with the authentication information stored in the authentication information storage section, and when the user of the external storage device is the registered user and when the image data in the first data format is stored in the external storage device, the control section transmits, to a transmission destination indicated by the transmission destination information corresponding to the user of the external storage device, via the communication section, the application software or information for downloading the application software from the application storage section.

Consequently, the image data in the first data format is stored in the external storage device, whereas the application software for processing the image data in the first data format is not stored in the external storage device but transmitted to the transmission destination corresponding to the user. Accordingly, even if the external storage device falls into hands of a third party due to accidental loss or theft, there is little risk that the image data is used by the third party. Further, since the application software is automatically transmitted from the digital multifunction printer to the transmission destination corresponding to the user, the user of the external storage device can receive the application software at the user's own terminal device, and can carry out, with use of the application software, display, editing, printing etc. of the image data in the first data format stored in the external storage device.

The image data storage system of the present invention may be arranged such that when the memory mounting section stores image data in the external storage device, when image data is stored in the external storage device and then the control section receives an application transmission instruction from the user via the operation input section, or when image data is stored in the external storage device and then the external storage device is dismounted from the memory mounting section, the control section transmits, to the server via the communication section, the transmission instruction to transmit, from the server, the application software to the transmission destination indicated by the transmission destination information corresponding to the user of the external storage device, or the control section transmits, to the transmission destination indicated by the transmission destination information corresponding to the user of the external storage device, via the communication section, the information for downloading the application software from the application storage section.

With the arrangement, when the image data in the first data format is stored in the external storage device, the application software for processing the image data in the first data format can be automatically transmitted to the transmission destination corresponding to the user of the external storage device.

The image data storage system of the present invention may be arranged so as to include: a digital multifunction printer including an image reading section for reading a document so as to acquire image data of the document, an image forming section for forming on a recording material an image corresponding to image data, and a communication section for communicating with other device connected with the digital multifunction printer via a network; and a terminal device including a second communication section for communicating with other device connected with the terminal device via the network, the digital multifunction printer further including: a memory mounting section for mounting an external storage device in such a manner that the external storage device is removable, and for storing, in the mounted external storage device, image data in a first data format used when the multifunction printer processes image data; an operation input section for receiving an operation input from a user; an application storage section for storing application software for at least one of display, editing, and printing of the image data in the first data format; and a control section for controlling operation of the communication section, the terminal device further including: a second memory mounting section for mounting the external storage device in such a manner that the external storage device is removable; a second operation input section for receiving an instruction input from the user; and a second control section for, when receiving an application request instruction from the user via the second operation input section, transmitting an application transmission request to the digital multifunction printer via the second communication section, when receiving from the user via the operation input section an instruction to transmit the application software or when receiving the application transmission request from the terminal device, the control section transmitting, to the terminal device via the communication section, the application software or information for downloading the application software from the application storage section.

The image data storage system of the present invention may be arranged so as to include: a digital multifunction printer including an image reading section for reading a document so as to acquire image data of the document, an image forming section for forming on a recording material an image corresponding to image data, and a communication section for communicating with other device connected with the digital multifunction printer via a network; a terminal device including a second communication section for communicating with other device connected with the terminal device via the network; and a server including a third communication section for communicating with other device connected with the server via the network, and an application storage section for storing application software for at least one of display, editing, and printing of image data in a first data format used when the multifunction printer processes image data, the digital multifunction printer further including: a memory mounting section for mounting an external storage device in such a manner that the external storage device is removable, and for storing, in the mounted external storage device, image data in the first data format; an operation input section for receiving an operation input from a user; and a control section for controlling operation of the communication section, the terminal device further including: a second memory mounting section for mounting the external storage device in such a manner that the external storage device is removable; a second operation input section for receiving an instruction input from the user; and a second control section for, when receiving an application request instruction from the user via the second operation input section, transmitting an application transmission request to the digital multifunction printer via the second communication section, when receiving from the user via the operation input section an instruction to transmit the application software to the terminal device or when receiving the application transmission request from the terminal device, the control section transmitting, to the server via the communication section, a transmission instruction to transmit the application software to the terminal device, or the control section transmitting, to the terminal device via the communication section, information for downloading the application software from the application storage section.

The image data storage system of the present invention may be arranged so as to include: a digital multifunction printer including an image reading section for reading a document so as to acquire image data of the document, an image forming section for forming on a recording material an image corresponding to image data, and a communication section for communicating with other device connected with the digital multifunction printer via a network; a terminal device including a second communication section for communicating with other device connected with the terminal device via the network; and a server including a third communication section for communicating with other device connected with the server via the network, and an application storage section for storing application software for at least one of display, editing, and printing of image data in a first data format used when the multifunction printer processes image data, the digital multifunction printer further including: a memory mounting section for mounting an external storage device in such a manner that the external storage device is removable, and for storing, in the mounted external storage device, image data in the first data format; an operation input section for receiving an operation input from a user; and a control section for controlling operation of the communication section, the terminal device further including: a second memory mounting section for mounting the external storage device in such a manner that the external storage device is removable; a second operation input section for receiving an instruction input from the user; and a second control section for, when receiving an application request instruction from the user via the second operation input section, transmitting an application transmission request to the server via the second communication section, when the third communication section receives the application transmission request from the terminal device, the server transmitting the application software to the terminal device via the third communication section.

With each of the arrangements, the image data in the first data format is stored in the external storage device, whereas the application software for processing the image data in the first data format is not stored in the external storage device but transmitted to the user's terminal device in response to the transmission request from the user, Accordingly, even if the external storage device falls into hands of a third party due to accidental loss or theft, there is little risk that the image data is used by the third party. Further, the user of the external storage device can receive the application software at the user's own terminal device, and can carry out, with use of the application software, display, editing, printing etc. of the image data in the first data format stored in the external storage device.

The image data storage system of the present invention may be arranged such that the digital multifunction printer further includes a display section for displaying information to a user, and when image data in the first data format is stored in the external storage device, the control section causes the display section to display information for acquiring the application software from the application storage section.

With the arrangement, when the image data in the first data format is stored in the external storage device, it is possible to inform the user of information for acquiring the application software from the application storage section. Accordingly, the user can acquire the application software corresponding to the image data in the first data format based on the information if necessary.

The present invention is not limited to the description of the embodiments above, but may be altered by a skilled person within the scope of the claims. An embodiment based on a proper combination of technical means disclosed in different embodiments is encompassed in the technical scope of the present invention within the scope of the claims.

INDUSTRIAL APPLICABILITY

The present invention is applicable to a digital multifunction printer capable of mounting an external storage device in such a manner that the external storage device is removable.

REFERENCE SIGNS LIST 1. image reading section
2. image processing section
3. image forming section
4. image data storage section
5. application storage section
6. authentication information storage section
7. operation panel (operation input section)
8. external memory mounting section (memory mounting section)
9. communication section
10. control section
50. external storage device
100. multifunction printer
200. computer (terminal device)
207. operation input section (second operation input section)
208. external memory mounting section (second memory mounting section)
209. communication section (second communication section)
210. control section (second control section)
300. server
305. application storage section
309. communication section (third communication section)
310. control section (third control section)

The invention claimed is:

1. A digital multifunction printer, comprising an image reading section for reading a document so as to acquire image data of the document, an image forming section for forming on a recording material an image corresponding to image data, and a communication section for communicating with other device connected with the digital multifunction printer via a network, the digital multifunction printer further comprising:
- a memory mounting section for mounting an external storage device in such a manner that the external storage device is removable, and for storing, in the mounted external storage device, image data in a data format used when the multifunction printer processes image data;
- an operation input section for receiving an operation input from a user;
- an authentication information storage section for storing authentication information of a registered user and transmission destination information indicative of a transmission destination to which data for the registered user is to be transmitted;
- an application storage section for storing application software for at least one of display, editing, and printing of the image data in the data format; and
- a control section for carrying out an authentication process to determine whether a user of the external storage device is the registered user or not by comparing user authentication information stored in the external storage device mounted on the memory mounting section or user authentication information inputted by the user via the operation input section with the authentication information stored in the authentication information storage section,
- when the user of the external storage device is the registered user and when the image data in the data format is stored in the external storage device, the control section transmitting, to a transmission destination indicated by the transmission destination information corresponding to the user of the external storage device, via the communication section, the application software or information for downloading the application software from the application storage section.

2. The digital multifunction printer as set forth in claim 1, wherein when the memory mounting section stores image data in the external storage device, when image data is stored in the external storage device and then the control section receives an application transmission instruction from the user via the operation input section, or when image data is stored in the external storage device and then the external storage device is dismounted from the memory mounting section, the control section transmits, to the transmission destination indicated by the transmission destination information corresponding to the user of the external storage device, via the communication section, the application software or the information for downloading the application software from the application storage section.

3. An image data storage system, comprising:
- a digital multifunction printer including an image reading section for reading a document so as to acquire image data of the document, an image forming section for forming on a recording material an image corresponding to image data, and a communication section for communicating with other device connected with the digital multifunction printer via a network; and
- a server including an application storage section for storing application software for at least one of display, editing, and printing of image data in a first data format used when the multifunction printer processes image data,
- the digital multifunction printer further including:
  - a memory mounting section for mounting an external storage device in such a manner that the external storage device is removable, and for storing, in the mounted external storage device, the image data in the data format;
  - an operation input section for receiving an operation input from a user;
  - an authentication information storage section for storing authentication information of a registered user and transmission destination information indicative of a transmission destination to which data for the registered user is to be transmitted; and
  - a control section for carrying out an authentication process to determine whether a user of the external storage device is the registered user or not by comparing user authentication information stored in the external storage device mounted on the memory mounting section or user authentication information inputted by the user via the operation input section with the authentication information stored in the authentication information storage section,
- when the user of the external storage device is the registered user and when the image data in the data format is stored in the external storage device, the control section transmitting, to the server via the communication section, a transmission instruction to transmit, from the server, the application software to a transmission destination indicated by the transmission destination information corresponding to the user of the external storage device, or the control section transmitting, to a transmission destination indicated by the transmission destination information corresponding to the user of the external storage device, via the communication section, information for downloading the application software from the application storage section.

4. The image data storage system as set forth in claim 3, wherein when the memory mounting section stores image data in the external storage device, when image data is stored in the external storage device and then the control section receives an application transmission instruction from the user via the operation input section, or when image data is stored in the external storage device and then the external storage device is dismounted from the memory mounting section, the control section transmits, to the server via the communication section, the transmission instruction to transmit, from the server, the application software to the transmission destination indicated by the transmission destination information corresponding to the user of the external storage device, or the control section transmits, to the transmission destination indicated by the transmission destination information corresponding to the user of the external storage device, via the communication section, the information for downloading the application software from the application storage section.

5. An image data storage system, comprising:
- a digital multifunction printer including an image reading section for reading a document so as to acquire image data of the document, an image forming section for forming on a recording material an image corresponding to image data, and a communication section for communicating with other device connected with the digital multifunction printer via a network; and
- a terminal device including a second communication section for communicating with other device connected with the terminal device via the network,
- the digital multifunction printer further including:
  - a memory mounting section for mounting an external storage device in such a manner that the external storage device is removable, and for storing, in the mounted external storage device, image data in a data format used when the multifunction printer processes image data;

an operation input section for receiving an operation input from a user; and an application storage section for storing application software for at least one of display, editing, and printing of the image data in the data format; and a control section for controlling operation of the communication section, the terminal device further including:

a second memory mounting section for mounting the external storage device in such a manner that the external storage device is removable;

a second operation input section for receiving an instruction input from the user; and a second control section for, when receiving an application request instruction from the user via the second operation input section, transmitting an application transmission request to the digital multifunction printer via the second communication section, when receiving from the user via the operation input section an instruction to transmit the application software or when receiving the application transmission request from the terminal device, the control section transmitting, to the terminal device via the communication section, the application software or information for downloading the application software from the application storage section.

6. The image data storage system as set forth in claim 5, wherein the digital multifunction printer further includes a display section for displaying information to a user, and when image data in the data format is stored in the external storage device, the control section causes the display section to display information for acquiring the application software from the application storage section.

7. An image data storage system, comprising:

a digital multifunction printer including an image reading section for reading a document so as to acquire image data of the document, an image forming section for forming on a recording material an image corresponding to image data, and a communication section for communicating with other device connected with the digital multifunction printer via a network;

a terminal device including a second communication section for communicating with other device connected with the terminal device via the network; and a server including a third communication section for communicating with other device connected with the server via the network, and an application storage section for storing application software for at least one of display, editing, and printing of image data in a data format used when the multifunction printer processes image data, the digital multifunction printer further including:

a memory mounting section for mounting an external storage device in such a manner that the external storage device is removable, and for storing, in the mounted external storage device, image data in the data format;

an operation input section for receiving an operation input from a user; and a control section for controlling operation of the communication section, the terminal device further including:

a second memory mounting section for mounting the external storage device in such a manner that the external storage device is removable;

a second operation input section for receiving an instruction input from the user; and a second control section for, when receiving an application request instruction from the user via the second operation input section, transmitting an application transmission request to the digital multifunction printer via the second communication section, when receiving from the user via the operation input section an instruction to transmit the application software to the terminal device or when receiving the application transmission request from the terminal device, the control section transmitting, to the server via the communication section, a transmission instruction to transmit the application software to the terminal device, or the control section transmitting, to the terminal device via the communication section, information for downloading the application software from the application storage section.

8. The image data storage system as set forth in claim 7, wherein the digital multifunction printer further includes a display section for displaying information to a user, and when image data in the data format is stored in the external storage device, the control section causes the display section to display information for acquiring the application software from the application storage section.

9. An image data storage system, comprising:

a digital multifunction printer including an image reading section for reading a document so as to acquire image data of the document, an image forming section for forming on a recording material an image corresponding to image data, and a communication section for communicating with other device connected with the digital multifunction printer via a network;

a terminal device including a second communication section for communicating with other device connected with the terminal device via the network; and a server including a third communication section for communicating with other device connected with the server via the network, and an application storage section for storing application software for at least one of display, editing, and printing of image data in a data format used when the multifunction printer processes image data, the digital multifunction printer further including:

a memory mounting section for mounting an external storage device in such a manner that the external storage device is removable, and for storing, in the mounted external storage device, image data in the data format;

an operation input section for receiving an operation input from a user; and a control section for controlling operation of the communication section, the terminal device further including:

a second memory mounting section for mounting the external storage device in such a manner that the external storage device is removable;

a second operation input section for receiving an instruction input from the user; and a second control section for, when receiving an application request instruction from the user via the second operation input section, transmitting an application transmission request to the server via the second communication section, when the third communication section receives the application transmission request from the terminal device, the server transmitting the application software to the terminal device via the third communication section.

10. The image data storage system as set forth in claim 9, wherein the digital multifunction printer further includes a display section for displaying information to a user, and when image data in the data format is stored in the external storage device, the control section causes the display section to display information for acquiring the application software from the application storage section.

\* \* \* \* \*